United States Patent [19]

Slavitter

[11] 4,135,798
[45] Jan. 23, 1979

[54] CAM ACTUATED COUPLING AND LATCHING APPARATUS

[75] Inventor: Frederick Slavitter, Needham, Mass.

[73] Assignee: Polaroid Corporation, Cambridge, Mass.

[21] Appl. No.: 854,090

[22] Filed: Nov. 23, 1977

[51] Int. Cl.$^2$ .................. G03B 3/02; G03B 13/02; G03B 13/20
[52] U.S. Cl. .................. 354/163; 350/255; 354/195
[58] Field of Search .......... 350/255, 257; 354/163, 354/167, 196, 199, 195, 219

[56] References Cited

U.S. PATENT DOCUMENTS

| | | | |
|---|---|---|---|
| 2,027,411 | 1/1936 | Whittaker | 354/195 |
| 2,101,543 | 12/1937 | Henkel | 354/196 |
| 3,522,764 | 8/1970 | Biber et al. | 354/195 |
| 3,541,941 | 11/1970 | Barr et al. | 354/195 |
| 3,914,777 | 10/1975 | Slavitter | 354/196 |

Primary Examiner—Donald A. Griffin
Attorney, Agent, or Firm—John J. Kelleher

[57] ABSTRACT

In a variable focus lens camera having a rangefinder that is operatively coupled to the lens of said camera for focusing thereof, a known relationship must exist between subject distance as determined by said rangefinder and the subject-in-focus position of said lens, to properly focus the image of the subject to be photographed at said camera's film plane. The present invention provides an arrangement whereby a portion of the means for moving said lens to the correct in-focus position is pivotally uncoupled from said lens by cam actuating means so that the proper rangefinder to lens-position relationship can be established. Once this relationship is established, the uncoupled portion of said lens movement means is recoupled to said variable focus lens by cam actuated pivotal movement of same and is maintained in this coupled position by interlocking said cam actuating means with variable focus lens support structure.

12 Claims, 7 Drawing Figures

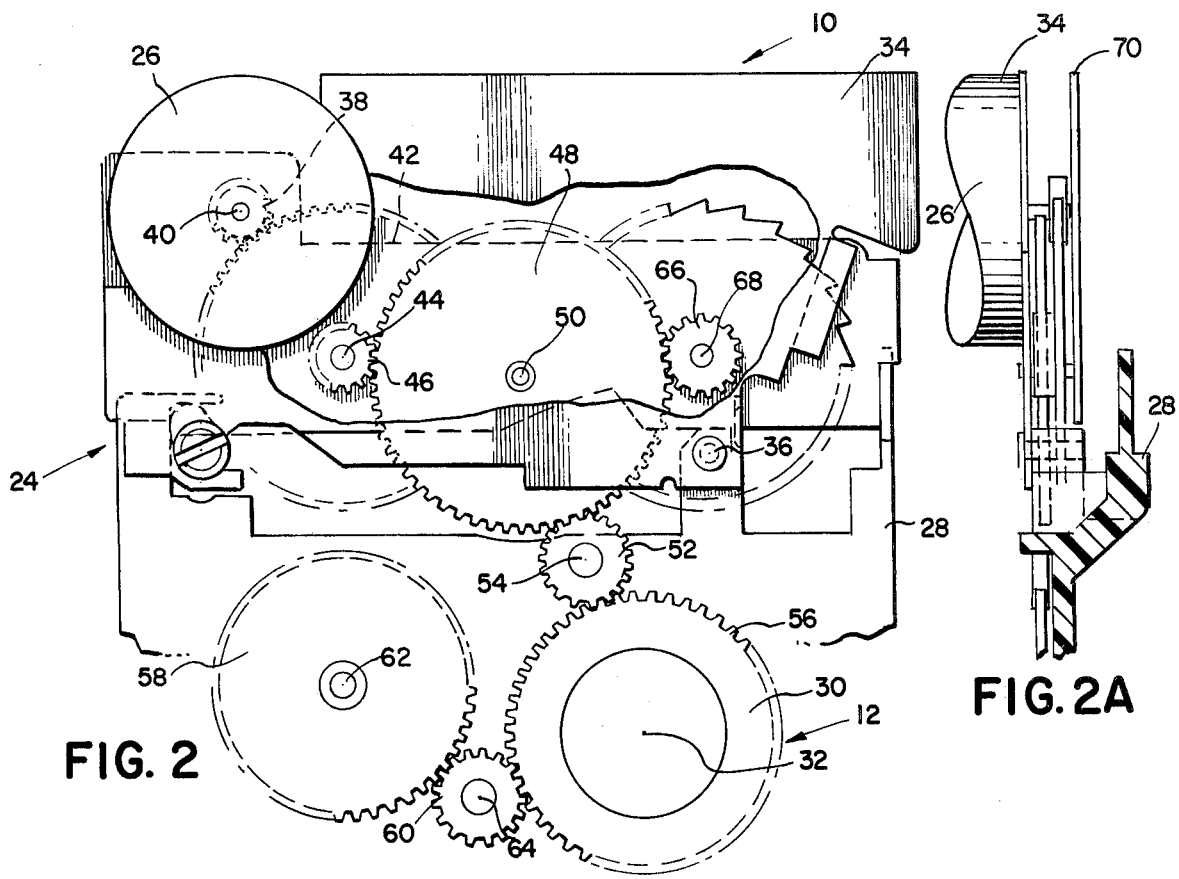
FIG. 2
FIG. 2A
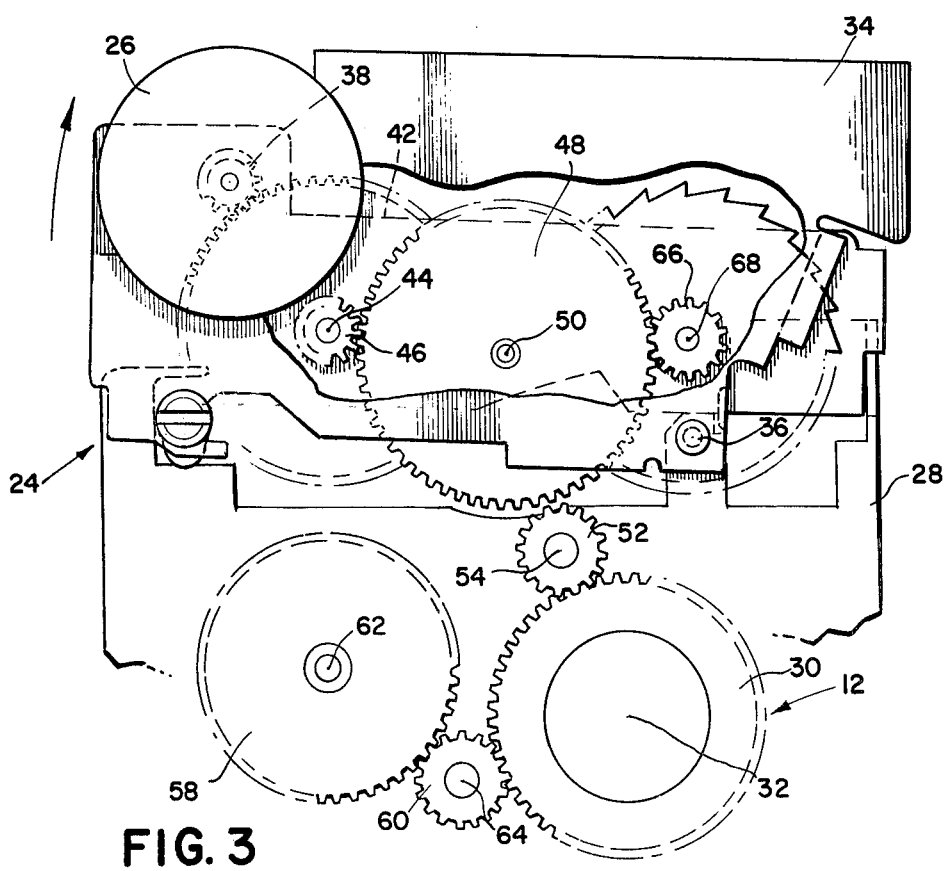
FIG. 3

CAM ACTUATED COUPLING AND LATCHING APPARATUS

BACKGROUND OF THE INVENTION

1. Field of the Invention

This invention relates to variable focus lens photographic cameras in general, and to such cameras having rangefinding means that are coupled to the lens of such a camera for lens focusing, in particular.

2. Description of the Prior Art

Photographic cameras incorporating variable focus lenses for focusing the image of a subject to be photographed at the film plane of such a camera are well known in the prior art. Apparatus included in such cameras for simultaneously determining the distance to a subject to be photographed and focusing said variable focus lens so that an in-focus image of said subject is formed at said film plane, are also well known in the prior art. Focusing apparatus of this type is generally referred to as a coupled rangefinder.

In order to properly focus the variable focus lens of a camera by means of a coupled rangefinder, a known relationship must exist between subject distance as determined by said rangefinder and the subject-in-focus position of said lens, to properly focus the image of a subject to be photographed at said camer's film plane. During manufacture, for example, the rangefinder and variable focus lens are normally assembled on the camera body without this relationship having first been established. However, this relationship is established later in the manufacturing cycle when it is more convenient and efficient to do so. The procedure for establishing this relationship is sometimes referred to as rangefinder to lens calibration.

A coupled rangefinder is normally linked to its associated variable focus lens through a mechanical coupling device such as a set of gears. Part of the normal rangefinder to variable focus lens calibration procedure involves the uncoupling of said rangefinder from said variable focus lens by unmeshing said gears so that each of these devices may be separately adjusted to the same subject distance or reference point in order to correlate rangefinder determined distance to variable focus lens position. Once each of these devices is so adjusted, they are recoupled to one another and are maintained in that position for subsequent rangefinder to variable focus lens focusing.

Arrangements for uncoupling a rangefinder from a variable focus lens so that said rangefinder and said lens may be calibrated with respect to one another have been disclosed in the prior art. In one such arrangement, which is described in U.S. Pat. No. 3,914,777 to Slavitter, the inventor of the present invention, an optical rangefinder is coupled, through a gearing arrangement, to a camer's variable focus lens. One of the gears in said gearing arrangement coupling said optical rangefinder to said variable focus lens is an idler gear that is normally meshed with two gears, one that rotates in response to rangefinder movement and one that rotates with said lens. In order to uncouple the rangefinder from its associated variable focus lens, a force is applied to said idler gear in a direction that is generally parallel to said idler gear's axis of rotation, against a biasing spring that normally maintains said idler gear in its fully engaged position. When fully depressed, the idler gear is disengaged from said rangefinder related gear and said lens gear so that the rangefinder and variable focus lens may be separately positioned. While this type of uncoupling arrangement is effective, it does have some inherent disadvantages. For example, in order to so axially move the idler gear, space must be provided adjacent said gear into which said gear can be moved. In many applications, it is not possible or feasible to provide the space that is necessary for this type of idler gear movement. In addition, if the gears that are normally meshed with the idler gear are the same width, and rotate in the same plane, said idler gear will become completely disengaged from both the rangefinder related gear and the lens gear when the rangefinder is uncoupled from its associated variable focus lens. In order to reengage these gears after calibration is complete, the teeth of the idler gear must be aligned with both the teeth of the rangefinder related gear and the teeth of the lens gear. If only one such alignment had to be made, it would be less difficult to recouple the rangefinder to the variable focus lens.

In the above-cited '777 patent to Slavitter, mention is made of a gear train coupling a rangefinder to a variable focus lens where said gear train includes an idler gear that is pivotable out of engagement with the rangefinder and variable focus lens related gears in order to uncouple said rangefinder from said variable focus lens. The idler gear is maintained in its engaged or coupled position by a spring force biasing means. A potential problem with this arrangement is the possibility of a reduction in the force transmitted by said spring biasing means if a change in the set of the spring portion of said spring force biasing means should occur, which could result in an unscheduled uncoupling of said rangefinder from said variable focus lens.

SUMMARY OF THE INVENTION

In accordance with the present invention, means are provided for coupling and uncoupling an actuating means associated with a rangefinder, to and from a variable focus lens in a photographic camera, and locking said coupling means in its fully coupled state. The variable focus lens is mounted on first camera support structure, the rangefinder related actuating means is mounted on second camera support structure, and said second support structure is mounted, by pivotal mounting means, on said first support structure. Complementary means mounted on said first and second support structures selectively displace one of said support structures with respect to the other of said support structures about an axis through said pivotal mounting means, between a first position where said actuating means and said variable focus lens are uncoupled from one another and a second position where said actuating means and said variable focus lens are coupled to one another through said coupling means and are locked in this coupled state by said complementary means.

BRIEF DESCRIPTION OF THE DRAWINGS

FIG. 2 is a front elevational view of a variable focus lens camera having a coupled rangefinder, showing the actuator associated with said rangefinder coupled to said variable focus lens and locked in said coupled position by the complementary displacing means of the present invention.

FIG. 2A is a right side view of the upper portion of the variable focus lens camera that is depicted in FIG. 2.

FIG. 3 is the same view as that of FIG. 2 except that said rangefinder actuator has been uncoupled from said variable focus lens by the complementary displacing means of the present invention.

DESCRIPTION OF THE PREFERRED EMBODIMENTS

Figure 1:
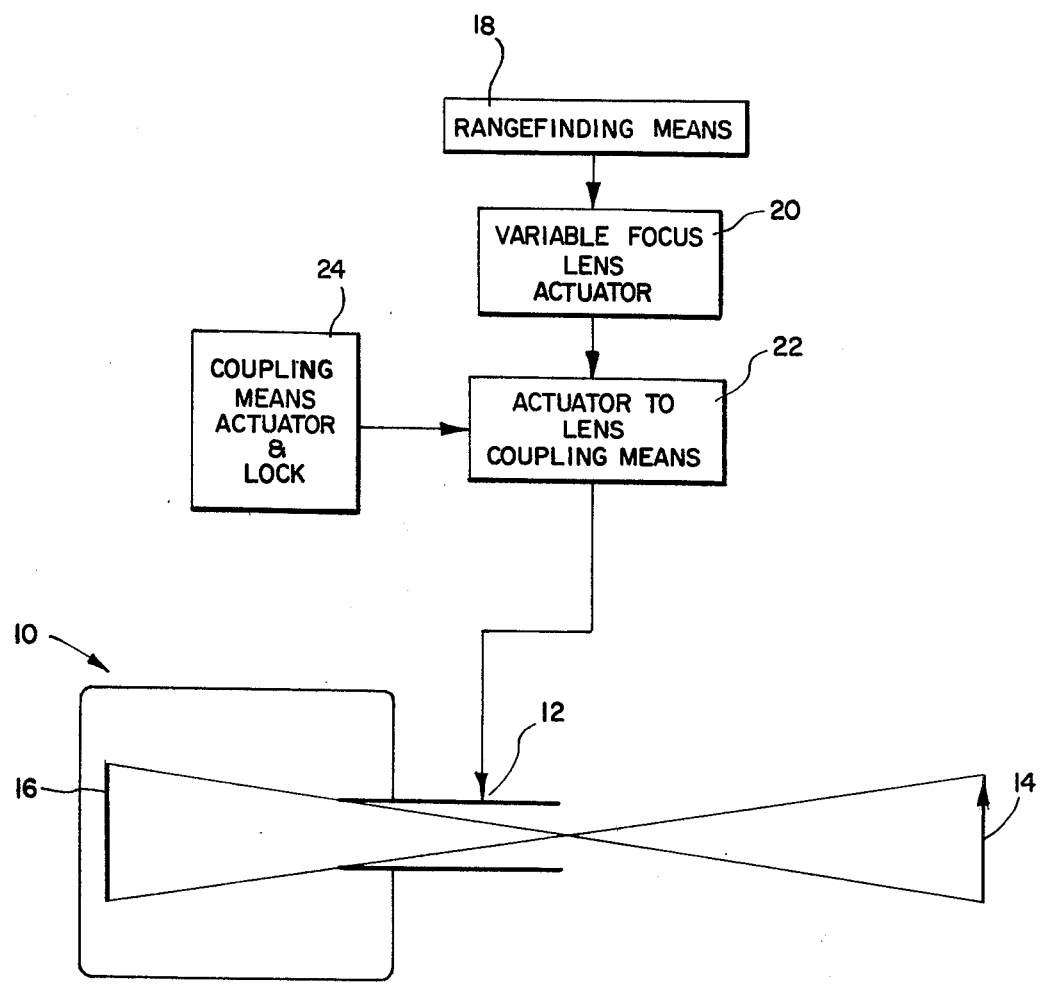
FIG. 1 is a functional block diagram of a variable focus lens camera having a coupled rangefinder and having means for uncoupling said rangefinder from said variable focus lens.

Referring now to the drawings, and specifically to FIG. 1, where a functional block diagram of photographic camera 10 incorporating a coupled rangefinder in accordance with a preferred embodiment of the present invention is depicted. Photographic camera 10 includes a variable focus lens 12 for focusing an in-focus image of subject 14 at film plate 16 of said camera 10. Camera 10 also includes rangefinding means 18 that is coupled to variable focus lens 12 through variable focus lens actuator 20 and actuator-to-lens coupling means 22.

The distance as determined by rangefinding means 18 must be correlated to the subject-in-focus lens position of variable focus lens 12 for proper rangefinder controlled variable focus lens focusing. During the initial portion of the camera manufacturing process, the rangefinding means and the variable focus lens are assembled on the camera without this relationship having first been established. The normal procedure for correlating the distance as determined by rangefinding means 18 to the in-focus position of variable focus lens 12 is to initially uncouple rangefinding means 18 from variable focus lens 12 so that each of these portions of camera 10 may be separately adjusted to the same subject distance, such as the distance to subject 14. This uncoupling is accomplished by actuating actuator-to-lens coupling means 22 to its uncoupled position by coupling means actuator and lock 24 so that said rangefinding means 18 and said variable focus lens 12 may be correlated to the same subject distance. Once the distance as determined by rangefinding means 18 has been correlated to the corresponding in-focus position of variable focus lens 12, rangefinding means 18 is again coupled to variable focus lens 12 through variable focus lens actuator 20 and actuator-to-lens coupling means 22 by actuating actuator-to-lens coupling means 22 to its coupled position by coupling means actuator and lock 24 and maintaining said coupling means 22 in its coupled position by said coupling means actuator and lock 24. The specific details of the lens actuator associated with rangefinding means 18 and how it cooperates with variable focus lens 12 can be better understood by referring to FIG. 2.

FIG. 2 is a front elevational view of camera 10 showing rotary actuator or motor 26 coupled, through gearing, to variable focus lens 12. Variable focus lens 12 is mounted on baseplate 28 and said baseplate 28 is mounted in a fixed position to the body of photographic camera 10 (not shown). Variable focus lens 12 is the same as that depicted in the above-mentioned '777 patent to Slavitter in that said lens is focused by rotating movable element 30 of variable focus lens 12 about axis 32, which causes axial movement of said element 30 along said axis 32 to focus said variable focus lens 12. Rotary actuator 26 is mounted on front plate 34 and said front plate 34 is pivotally mounted by screw 36 to baseplate 28. Front plate 34 is maintained in a fixed position with respect to baseplate 28 by coupling means actuator and lock 24 which consists of complementary means 24 which is partially mounted on said baseplate 28 and partially mounted on said front plate 34. Complementary means 24 will be described in greater detail elsewhere herein.

Rotary actuator or motor 26 which supplies a rotary force for focusing variable focus lens 12 is mounted in a fixed position on front plate 34. Motor pinion gear 38 is mounted on motor shaft 40 and is in a fixed relation with respect thereto. Main drive gear 42 is mounted for rotation on shaft 44, said shaft 44 being in a fixed relation with respect to front plate 34. The peripheral teeth of gear 42 and the peripheral teeth of gear 38 are in a meshed relation such that rotation of one of said gears causes rotation of the other. Main drive pinion gear 46 is mounted for rotation about shaft 44, said gear 46 being selectively maintained in a fixed position with respect to main drive gear 42 by clutch means (not shown). Second idler gear 48 is mounted for rotation on shaft 50, said shaft 50 being in a fixed relation with respect to front plate 34. The peripheral teeth of second idler 48 and the peripheral teeth of main drive pinion gear 46 are in a meshed relation such that rotation of one of said gears causes rotation of the other. First idler gear 52 is mounted for rotation on shaft 54, said shaft being in a fixed relation with respect to baseplate 28. The peripheral teeth of second idler gear 52 are in a meshed relation with respect to the peripheral teeth of first idler gear 48 and therefore rotation of one of said idler gears will result in the rotation of the other. Lens or ring gear 56 forms a portion of movable element 30 of variable focus lens 12 and is mounted for movement therewith. The movement of movable element 30 of variable focus lens 12 for lens focusing purposes has previously been described above. The peripheral teeth of lens gear 56 are in a meshed relation with respect to the peripheral teeth of second idler gear 52 and the rotation of one of said gears will result in the rotation of the other. From the above description, it can be seen that the rotation of rotary actuator pinion gear 38 by rotary actuator 26 will result in rotational and axial movement of movable element 30 of variable focus lens 12.

Lens gear 56 is also coupled to focus wheel 58 through idler gear 60. Focus wheel 58 is rotationally mounted on shaft 62, said shaft being in a fixed position with respect to baseplate 28. Idler gear 60 is rotationally mounted on shaft 64, said shaft 64 being in a fixed position with respect to baseplate 28. The peripheral teeth of idler gear 60 are in a meshed relation with the peripheral teeth of focus wheel 58 and lens gear 56 and therefore rotation of said focus wheel 58 will result in the rotation of lens gear 56 and in the focusing of variable focus lens 12.

The position of element 30 of variable focus lens 12 is sensed by lens position sensing gear 66 which is mounted for rotation on shaft 68, said shaft 68 being mounted in a fixed position with respect to front plate 34. The peripheral teeth of lens position sensing gear 66 are meshed with the peripheral teeth of first idler gear 48 and first idler gear 48 is coupled to variable focus lens 12 as previously discussed. Therefore, the rotation of element 30 of variable focus lens 12 will result in the rotation of lens position sensing gear 66. The lens position of variable focus lens 12 as sensed by lens position sensing gear 66 is transmitted to the control system (not shown) associated with rotary actuator 26 for variable focus lens 12 focusing purposes. In camera 10, focus wheel 58 is associated with an optical rangefinder, of a conventional type (not shown), and rotary actuator 26 is associated with an acoustical type rangefinder such as that described in U.S. Pat. No. 3,522,764, to Biber et al.

FIG. 2A is a right side view of the upper portion of photographic camera 10 that is depicted in FIG. 2. As previously discussed, gears 42, 48 and 66 are mounted on shafts 44, 50 and 68, respectively. Shafts 44, 50 and 68 are supported at one end by front plate 34, and at their other end by backplate 70, said backplate 70 being attached to frontplate 34. Mounting backplate 70 on front plate 34 places gears 42, 46, 48 and 66 between said front plate 34 and said backplate 70.

FIG. 3 is the same view as that of FIG. 2 except that rotary actuator 26 has been uncoupled from said variable focus lens 12 by complementary displacing means 24. Complementary displacing means 24 has been actuated such that front plate 34 has been pivoted clockwise around an axis through screw 36 which pivotally attaches front plate 34 to baseplate 28. As a result of this rotation by complementary displacing means 24, the teeth at the periphery of first idler gear 48 have been unmeshed from the teeth at the periphery of second idler gear 52. As a result of the unmeshing of second idler gear 48 from first idler gear 52, rotary actuator 26 has been uncoupled from variable focus lens 12, leaving rotary actuator 26 and variable focus lens 12 free to rotate independently of one another. At this point, the rotational position of rotary actuator 26 corresponding to a focus position of variable focus lens 12 that will result in an in-focus image of subject 14 (FIG. 1), for example, at film plane 16 (FIG. 1) of camera 10, can be established. Once this relationship is established, rotary actuator 26 is again coupled to variable focus lens 12 by actuating complementary displacing means 24 such that the teeth at the periphery of second idler gear 48 mesh with the teeth at the periphery of first idler gear 52.

The positioning of variable focus lens 12 when uncoupled from rotary actuator 26 may be accomplished by utilizing the optical rangefinder associated with focus wheel 58 and adjusting focus wheel 58 to the in-focus position as described above or may be positioned directly in accordance with external calibration equipment. The rotational position of rotary actuator 26 corresponding to the in-focus position of subject 14 (FIG. 1) may be established by utilizing rangefinding means 18 (FIG. 1) of camera 10 or by introducing an artificial signal into rangefinding means 18 corresponding to the actual distance to said subject 14.

Figure 4:
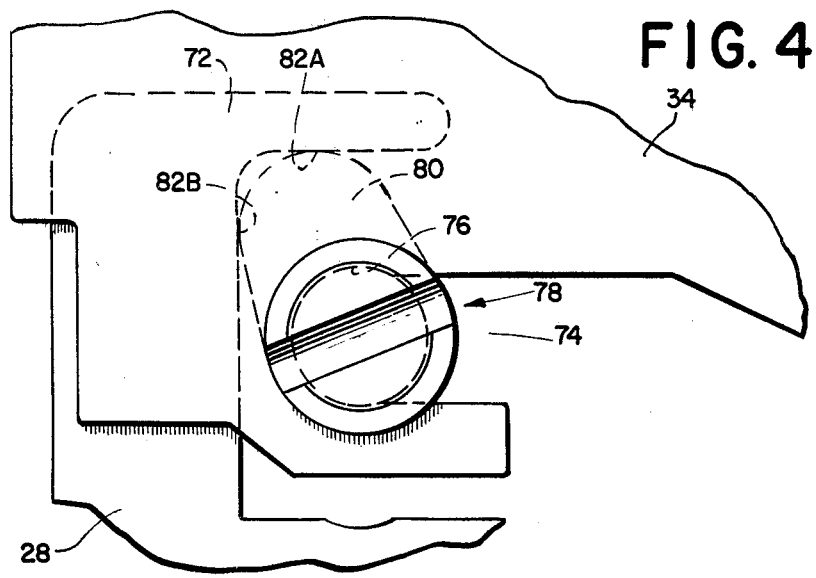
FIG. 4 is an enlarged detail of the complementary displacing means depicted in FIG. 2 shown in its coupled and locked position.

The specific details of complementary displacing means 24 can be more clearly understood by referring to FIG. 4. In FIG. 4, an enlarged detail of the complementary displacing means depicted in FIG. 2 is illustrated. Complementary displacing means 24 is shown in its coupled and locked position where it maintains frontplate 34 in a fixed position with respect to baseplate 28 and maintains second idler gear 48 meshed with first idler gear 52 (FIG. 2).

Baseplate 28 includes L-shaped arm 72 projecting therefrom. Front plate 34 includes slot-type opening 74 having circular bottom portion 76. Cam member 78 is rotatably mounted in said slot 74 in said circular bottom portion 76. Lobe 80 of said cam member 78 has been rotated to a position where the cam surface of said lobe 78 contacts internal surfaces 82A and 82B of L-shaped arm 72. With cam member 78 in this position, front plate 34 has been pivoted about an axis through screw 36 (FIG. 2) by means of the cam surface of cam lobe 80 engaging surface 82A of L-shaped arm 72. At this point, the region of front plate 34 that mounts cam member 78 has been moved to its nearest position with respect to baseplate 28. Also, front plate 34 is rotationally locked to first support structure 28 in that rotation of said front plate 34 about an axis through screw 36 (FIG. 2) will be prevented by the engagement of the cam surface of cam lobe 80 with inner surfaces 82A and 82B of L-shaped arm 72. A force on front plate 34 tending to rotate said front plate 34 about an axis through screw 36 (FIG. 2) will attempt to rotate cam 74 in a counterclockwise direction. However, such movement will be prevented by the engagement of the cam surface of cam lobe 80 with inner surface 82B of L-shaped arm 72.

Figure 5:
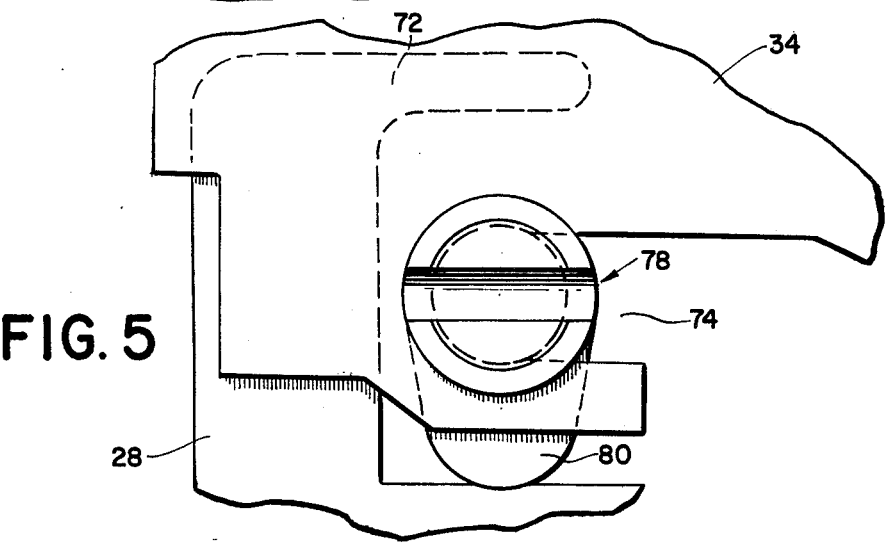
FIG. 5 is an enlarged detail of the complementary displacing means depicted in FIG. 3 shown in its uncoupled and displaced position.

FIG. 5 is an enlarged detail of complementary displacing means 24 depicted in FIG. 3, shown in its uncoupled and displaced position. Cam member 78 has been rotated clockwise from that position depicted in FIG. 4 to the point where lobe 80 of cam member 78 engages baseplate 28. In this position, front plate 34 has been pivoted about an axis through screw 36 (FIG. 3) and has uncoupled second idler gear 48 from first idler gear 52. With cam member 78 rotatably mounted on front plate 34, the engagement of lobe 80 of cam member 78 with baseplate 28 separates the slot 74 end of front plate 34 from baseplate 28 resulting in the uncoupling of said second idler gear 48 from said first idler gear 52.

Figure 6:
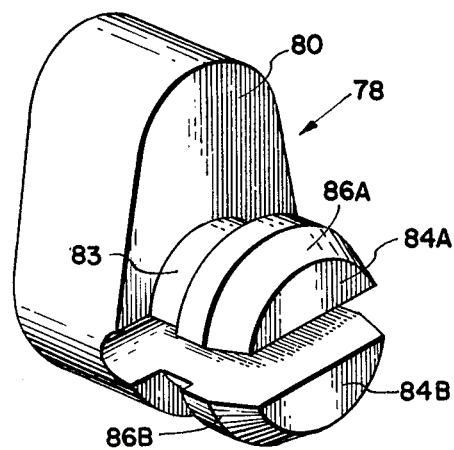
FIG. 6 is an enlarged detail of the cam member portion of the complementary displacing means depicted in the enlarged details of FIGS. 4 and 5.

FIG. 6 is an enlarged detail of cam member 78 depicted in the detail drawings of FIGS. 4 and 5. Cam member 78 includes a cylindrical shaft 83 from which lobe 80 laterally extends. Shaft 83 is bifurcated into branches 84A and 84B along the longitudinal axis of said shaft 83, said bifurcation terminating in the region where lobe 80 laterally projects from said shaft 83. Branches 84A and 84B of bifurcated shaft 83 include raised shoulder portions 86A and 86B, respectively, on their outer surfaces. Cam member 78 is mounted on front plate 34 (FIGS. 4 and 5) by manually pressing branches 84A and 84B of bifurcated shaft 83 towards one another and inserting the cylindrical portion of shaft 83 into the circular bottom portion 76 of slot 74 such that lobe 80 of cam member 78 is between front plate 34 (FIG. 5) and backplate 70 (FIG. 2A) and then said force supplied to branches 84A and 84B of bifurcated shaft 83 is removed. By extending the bifurcation in cylindrical shaft 83 into the lobe 80 region of cam member 78, less force is required to force branch 84A towards branch 84B for cam member 78 mounting purposes.

DISCUSSION

In the preferred embodiment of the present invention the actuator that is uncoupled from the variable focus lens is one that has been described as an electrical motor or rotary actuator. This motor rotates in response to lens positioning signals derived from an acoustical type rangefinding means. However, the coupling and locking means of the present invention could be utilized in a photographic camera where the rotary actuator as described in the preferred embodiment of the present invention is replaced by a manual focus wheel such as manual focus wheel 58 in said photographic camera 10.

In the preferred embodiment, rotary actuator 26 is coupled to variable focus lens 12 through a gear train consisting of gears 38, 42, 46, 48, 52 and 56. The intermediate gears in this gear train are utilized to modify the mechanical advantage between said actuator 26 and said variable focus lens 12. For variable focus lenses having different torque load considerations it may be possible to directly mesh gear 38 on rotary actuator 26 with gear 56 on variable focus lens 12 without relying on any intermediate gears. In such an arrangement, rotary actuator 26 would still be mounted on front plate 34 and variable focus lens 12 would be mounted on baseplate 28 and complementary displacing means 24 would function in the same manner as in the preferred embodiment.

Additionally, in the preferred embodiment, a gear train is utilized to couple rotary actuator 26 to variable focus lens 12. The present invention can also be utilized to uncouple and lock other mechanical coupling means, such as a spline shaft, whose component parts are mounted on structure that is equivalent to front plate 34 and baseplate 28 described herein.

It will be apparent to those skilled in the art from the foregoing description of my invention that various improvements and modifications can be made in it without departing from its true scope. The embodiment described herein is merely illustrative and should not be viewed as the only embodiment that might encompass my invention.

What is claimed is:

1. A photographic camera comprising:
    a first support structure;
    a variable focus lens mounted on said first support structure for forming an image of a subject to be photographed at a focal plane within said camera;
    a second support structure connected to said first support structure for pivotal movement with respect thereto about an axis parallel to the optical axis of said lens;
    a motor mounted on said second support structure;
    complementary means respectively mounted on said first and second support structures for selectively displacing one of said support structures about said pivotal axis relative to the other of said support structures between a first predetermined arrangement and a second predetermined arrangement, said displacing means including an actuator mounted for displacement between a first predetermined position wherein said support structures are disposed in their said first arrangement and a second predetermined position wherein said second support structures are disposed and locked in their said second arrangement; and
    means for coupling said motor to said lens so that said motor may be energized to effect the focusing of said lens, said coupling means including a first gear mounted on said first support structure and a second gear mounted on said second support structure, said first and second gears lying in substantially the same plane for rotation about axes substantially parallel to said optical axis of said lens and arranged so as to be inoperably disposed relative to one another when said actuator is in its said first position causing said support structures to be disposed in their said first arrangement and so as to be operably engaged when said actuator is in its said second position causing said support structures to be disposed and locked in their said second arrangement.

2. Apparatus as defined in claim 1 wherein that portion of said complementary displacing means mounted on said first support structure is configured such that it is in an interlocking relationship with that portion of said complementary means mounted on said second support structure, said interlocking relationship limiting the pivotal movement of the displaced support structure after said motor has been uncoupled from said variable focus lens.

3. Apparatus as defined in claim 1, wherein said complementary displacing means comprises:
    a slot in said second support structure, said slot including an opening and a circular bottom portion;
    a cam member, said cam member including a bifurcated cylindrical shaft that is divided into two longitudinal branches, said shaft having a lobe portion extending laterally therefrom, said bifurcation terminating in the region of said laterally extending shaft lobe, said shaft having a shoulder portion at its bifurcated end, each of said branches in the bifurcated portion of said shaft being displaceable toward one another so that the cylindrical portion of said shaft between said lobe portion and said shoulder portion can be inserted through said slot opening and into said circular bottom portion of said slot for rotation therein; and
    an arm projecting from said first support structure, the rotation of said cam member shaft causing said cam member lobe to contact said first support structure arm for displacing said second support structure to and locking said support structure in said second predetermined arrangement.

4. Apparatus as defined in claim 3, wherein said arm projecting from said first support structure includes at least two exterior plane surface portions, said surface portions forming an angle with one another, one of said surfaces being physically more remote from said first support structure than another of said surfaces, and wherein said cam member contacts each of said plane surfaces to lock said second support structure in said second predetermined arrangement.

5. Apparatus as defined in claim 4, wherein said arm projecting from said first support structure is of L-shape.

6. A photographic camera comprising:
    a housing;
    means within said housing for defining a film exposure plane;
    first support structure mounted on said housing, having an arm projecting therefrom;
    second support structure pivotally mounted on said first support structure, said second support structure having an opening therein;
    a variable focus lens mounted on said first support structure, for forming a subject image at said film exposure plane;
    actuating means mounted on said second support structure, for variable focus lens focusing;
    means for coupling said actuating means to said variable focus lens so that focusing of said lens by said actuating means may be effected; and
    a cam member mounted for rotation in said second support structure opening, operative between a first rotational position where said cam member engages said first support structure, pivotally moving a portion of said second support structure away from said first support structure, causing said coupling means to uncouple said actuating means from said variable focus lens by said second support structure pivotal movement, and a second rotational position where said cam engages said arm projecting from said first support structure pivotally moving said portion of said second support structure backward toward said first support structure causing said coupling means to couple said actuating means to said variable focus lens by said backward pivotal movement of said portion of said second support structure and to rotationally lock said second support in a fixed position with respect to said first support structure.

7. Apparatus as defined in claim 6, wherein said arm projecting from said first support structure is configured such that it is in an interlocking relationship with said cam member, said interlocking of said arm and said cam member limiting said second structure pivotal movement away from said first structure after said actuating means has been uncoupled from said variable focus lens.

8. Apparatus as defined in claim 6, wherein said opening in said second support structure is a slot having an opening and a circular bottom portion, and wherein said cam member includes a bifurcated cylindrical shaft that is divided into two branches, said shaft having a lobe portion extending laterally therefrom, said bifurcation terminating in the region of said laterally extending shaft lobe, said shaft having a shoulder portion at its bifurcated end, each of said branches in the bifurcated portion of said shaft being displaceable toward one another so that the cylindrical portion of said shaft between said lobe portion and said houlder portion can be inserted through said slot opening and into said circular bottom portion of said slot for rotation therein.

9. Apparatus as defined in claim 6, wherein said coupling means includes a first gear mounted on said first support structure and a second gear mounted on said second support structure, said first and second gears lying in substantially the same plane for rotation about axes substantially parallel to the axis of pivotal movement of said second support structure, said gears arranged to be in an unmeshed relationship when said cam member is in said first rotational position and in a meshed relationship when said cam member is in said second rotational position.

10. Apparatus as defined in claim 6, wherein said actuating means is an electrical motor.

11. Apparatus as defined in claim 6, wherein said arm projecting from said first support structure includes at least two exterior plane surface portions, said surface portions forming an angle with one another, one of said surfaces being physically more remote from said first support structure than another of said surfaces, and wherein said cam member contacts each of said plane surfaces to rotationally lock said second support structure in said fixed position with respect to said first support structure.

12. Apparatus as defined in claim 11, wherein said arm projecting from said first support structure is of L-shape.

* * * * *